(No Model.)

H. C. SERGEANT.
VALVE GEAR FOR ENGINES.

No. 582,881. Patented May 18, 1897.

Witnesses:—
George Barry Jr.
R. B. Suward

Inventor
Henry C. Sergeant
by attorneys

UNITED STATES PATENT OFFICE.

HENRY C. SERGEANT, OF WESTFIELD, NEW JERSEY, ASSIGNOR TO THE INGERSOLL-SERGEANT DRILL COMPANY, OF NEW YORK, N. Y.

VALVE-GEAR FOR ENGINES.

SPECIFICATION forming part of Letters Patent No. 582,881, dated May 18, 1897.

Application filed January 2, 1896. Serial No. 574,026. (No model.)

*To all whom it may concern:*

Be it known that I, HENRY C. SERGEANT, of Westfield, in the county of Union and State of New Jersey, have invented a new and useful Improvement in Valves and Valve-Gear for Direct-Action Engines, of which the following is a specification.

This invention relates to valves and valve-gear which are or may be applicable to direct-action engines generally, but more especially to rock-drilling engines for effecting the induction of the steam or other motive agent to and the eduction of such agent from the cylinder of the engine at opposite ends alternately, and it relates particularly to slide-valves for such engines operated by a tappet-lever the arms of which project within the cylinder and are operated upon by tappet-surfaces on the piston.

I will first describe my improvement with reference to the accompanying drawings and afterward point out its novelty in the claim.

Figure 1:
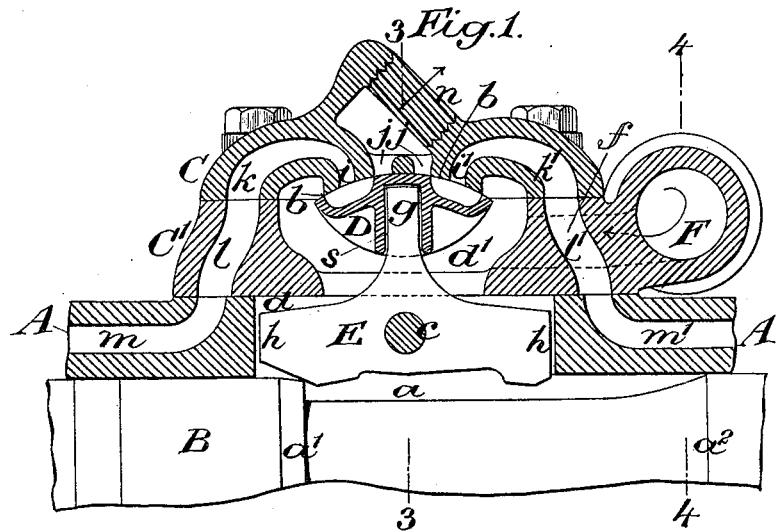
Figure 2:
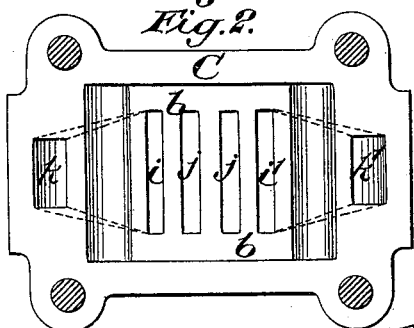
Figures 3, 4:
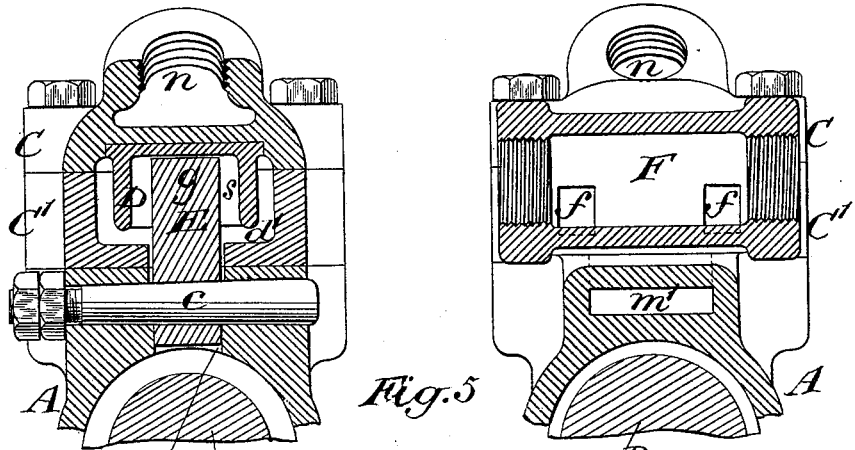
Figure 5:
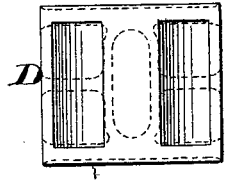

Figure 1 represents a central longitudinal section of a portion of the cylinder and of the valve-chest, valve, and valve-gear of a rock-drilling engine embodying my invention; Fig. 2, an inverted plan of the valve-chest cover, showing the face of the valve-seat; Fig. 3, a transverse section in the line 3 3 of Fig. 1; Fig. 4, a transverse section in the line 4 4 of Fig. 1; Fig. 5, a face view of the valve.

Similar letters of reference designate corresponding parts in all the figures.

A designates a portion of the engine-cylinder, and B the piston, having in its head an annular or lateral recess $a$, the ends $a'$ $a^2$ of which constitute the tappet-surfaces.

C C' designate the valve-chest, D the valve, and E the tappet-lever for operating the valve, the said lever working on a fixed pin $c$ within and through an opening $d$ in the top or one side of the cylinder and entering the cavity $d'$ within the valve-chest, which receives the steam or other motive fluid from the boiler or other source of supply through an inlet F and passages $f$. The valve-chest C C' is represented as composed of two separate pieces, of which C', which is the body of the chest, is placed directly on the cylinder, and C is placed over C' in the form of a cap or cover. The cap or cover part C is made separate from the cylinder to permit the introduction of the valve D, but the part C' or body part might be a portion of the cylinder, being represented as made separate for convenience of construction only.

The valve-seat $b$, which is formed in the back of the valve-chest—that is to say, in the inner face of the cap or cover C and faces toward the cylinder—has its longitudinal profile of the form of an arc the center of which is coincident with the axis of the pin $c$. The valve D, which faces away from the cylinder, has its face of a corresponding convex arc profile, and has on its back a socket $s$, which projects toward the bore of the cylinder for the reception of the arm $g$ of the three-armed tappet-lever E, the other two arms $h$ $h$ of which project through the opening $d$ into the cylinder, to be acted upon alternately by the tappet-surfaces $a'$ $a^2$ of the piston.

The valve D represented is what is known as the "double-D" slide kind, and the arrangement of the ports $i$, $i'$, and $j$ in its seat is such as is common to said valves, and therefore it is only necessary to here explain that the ports $i$ $i'$ communicate with the cylinder at opposite ends thereof, respectively, through passages $k$ $k'$, formed in the cover C, and corresponding passages $l$ $l'$ in the body C' of the valve-chest, and passages $m$ $m'$ in the cylinder, and that the ports $j$ $j$, which are practically only one port divided by a bridge, communicate through an outlet $n$ in the cover with the exhaust-pipe of the engine which is connected with that outlet.

The operation of the three-armed tappet-lever produced by the tappet-surfaces $a'$ $a^2$ of the piston on the tappet-arms $h$ $h$ of the said lever produces at each stroke of the piston the necessary movement of the valve to produce the induction of the steam or motive agent from the cavity $d'$ of the valve-chest to the cylinder and the eduction of said agent from the cylinder through the port $j$ in the valve-chest cover C. In this operation the space within the annular recess $a$ in the piston is always kept filled with the live steam or motive agent from the cavity $d'$ of the valve-chest, and hence pressure on the piston in opposite directions is balanced except as to the admission of the steam or other agent by the valve to opposite ends of the cylinder alternately for producing the reciprocating movement of the piston. The pressure within the valve-chest acting on the back of the valve holds the latter to its seat, while the tappet-arm $g$ acts on the valve without friction by reason of the face of the valve being concentric with the pin $c$, on which the tappet-lever E oscillates.

What I claim as my invention is—

The combination with an engine-cylinder and a piston therein provided with tappet-surfaces, of a valve-chest on the said cylinder containing a valve-seat of concave arc-formed longitudinal profile facing toward the cylinder, a valve having a corresponding convex arc-formed longitudinal profile facing from the cylinder, and a three-armed oscillating tappet-lever having its axis of oscillation coincident with the center of the arc of the valve and seat, one arm of the said lever engaging with the valve at the back thereof and its other two arms constituting tappets to be acted upon by the said tappet-surfaces, substantially as herein described.

HENRY C. SERGEANT.

Witnesses:
FREDK. HAYNES,
GEORGE BARRY, Jr.